United States Patent [19]

Ito et al.

[11] Patent Number: 5,742,493
[45] Date of Patent: Apr. 21, 1998

[54] POWER CONVERSION APPARATUS

[75] Inventors: Satoru Ito, Hitachi; Satoru Inarida; Kiyoshi Nakamura, both of Hitachinaka, all of Japan

[73] Assignee: Hitachi, Ltd., Tokyo, Japan

[21] Appl. No.: 705,655

[22] Filed: Aug. 30, 1996

[30] Foreign Application Priority Data

Sep. 8, 1995 [JP] Japan ................................ 7-230990

[51] Int. Cl.$^6$ ................................................ H02M 5/45
[52] U.S. Cl. ........................................ 363/37; 363/89
[58] Field of Search ................................ 363/34, 35, 36, 363/37, 52, 53, 84, 89, 125, 127; 318/800, 801, 805, 811

[56] References Cited

U.S. PATENT DOCUMENTS

| | | | |
|---|---|---|---|
| 4,788,485 | 11/1988 | Kawagishi et al. | 318/811 |
| 4,833,389 | 5/1989 | Kovalsky et al. | 363/37 |
| 5,177,677 | 1/1993 | Nakata et al. | 363/89 |
| 5,450,311 | 9/1995 | Esparza Olcina | 363/34 |
| 5,663,627 | 9/1997 | Ogawa | 363/37 |

FOREIGN PATENT DOCUMENTS

62-230357  9/1987  Japan.

*Primary Examiner*—Matthew V. Nguyen
*Attorney, Agent, or Firm*—Antonelli, Terry, Stout, & Kraus, LLP

[57] ABSTRACT

A power conversion apparatus has a PWM power converter coupled to an A.C. power supply on one side and to a D.C. load on the other side, a voltage controller for adjusting the D.C. output voltage from the converter, a power factor controller for adjusting the power factor on the A.C. side of the converter, a command generator for generating a PWM modulation factor and a phase signal in response to the voltage and an output from the power factor controller, and a PWM modulation unit for controlling the converter in response to these command signals. The power factor controller is controlled to reduce its power factor when a control parameter relating to the modulation factor of the converter approaches its limit value, and the power of the D.C. load is limited when a control parameter relating to the input power of the converter approaches its limit value, such that the power factor of the power converter is allowed to be reduced and the power of the D.C. load is limited respectively in each designated region, thereby preventing any overcurrent even if the power supply voltage fluctuates. As a result, continuous operation is maintained, making it possible to reduce the capacity of the converter required for generating the same output power over the conventional converter.

5 Claims, 6 Drawing Sheets

POWER CONVERSION APPARATUS

BACKGROUND OF THE INVENTION

The present invention relates to a power converter for converting A.C. power to D.C. power and in particular, it relates to a power conversion apparatus suitable for use in driving electric trains.

An example of prior control methods for PWM power converters for converting A.C. to D.C. is disclosed in JP-A-61-53394.

According to this prior control method, when the A.C. power supply voltage increases and the modulation factor of its converter approaches its limit value, continuation of operation is ensured by allowing the power factor to drop.

Here, when the A.C. power supply voltage further increases, thereby causing the power factor to drop further, the A.C. current will increase, if the power remains the same. However, the above-mentioned control method sets a limit value to its A.C. current command making it impossible to exceed the A.C. current upper limit, which is determined by its semiconductor devices and the like.

However, since no means for limiting the power of the D.C. load is provided, and only a means for limiting the power of the power converter for converting A.C. to D.C. is provided, there arises an unbalance in the respective powers between the power converter and the inverter. Thereby, since the voltage across the capacitor provided in the D.C. intermediate circuit decreases substantially during powering, the power conversion apparatus fails to function as a PWM power converter under these circumstances. Further, since the voltage across the capacitor increases substantially during regeneration, it becomes necessary to interrupt the operation of the whole system in order to protect the system when this condition occurs.

In this respect, there was such a problem is that it was impossible to actually maintain system operation in a particular operating region where the A.C. current must be limited, and thereby, in consequence requiring, an increased capacity for the power conversion apparatus was required.

SUMMARY OF THE INVENTION

The object of the present invention is to provide a PWM power converter which can be operated reliably without increasing its capacity for the same output requirement even under a condition where the power voltage fluctuates.

The above-mentioned object of the invention is accomplished by providing a power conversion apparatus having a PWM power converter for converting A.C. to D.C., with an inductance being coupled to an A.C. power supply and a capacitor or battery being coupled to a D.C. load; voltage control means for adjusting the D.C. output voltage from the converter; power factor control means for adjusting the power factor on the A.C. side; command means for producing commands including a PWM modulation factor and a phase signal, in response to outputs from the voltage control means and the power factor control means; and a PWM modulation unit for controlling the above-mentioned converter in response to these commands, wherein enable means is provided for allowing the aforementioned power factor control means to drop its power factor when a control parameter relating to the modulation factor of the converter approaches its limit value, and a limiter is provided for limiting the power of the D.C. load when a control parameter relating to the input power of the converter approaches its limit value.

Through the provision and arrangement of components of the invention as described above, a continuous operation at a constant power can still be maintained even if one of the control parameters, for example, the modulation factor, in the PWM power converter approaches its limit value, by suppressing its power factor to less than 1, so long as the A.C. current does not reach its limit value. Further, when the A.C. current reaches its limit value, a continuous operation is maintained by limiting the power to the D.C. load.

As a result, it becomes possible to obtain a relatively large output power using a relatively small capacity PWM power converter by decreasing the power factor only in a part of a limited operating region, and permitting the D.C. load power to drop slightly only in a part of another limited operating region.

PREFERRED EMBODIMENTS

One embodiment of the invention for driving A.C. electric trains will be described in the following with reference to FIG. 1.

Figure 1:
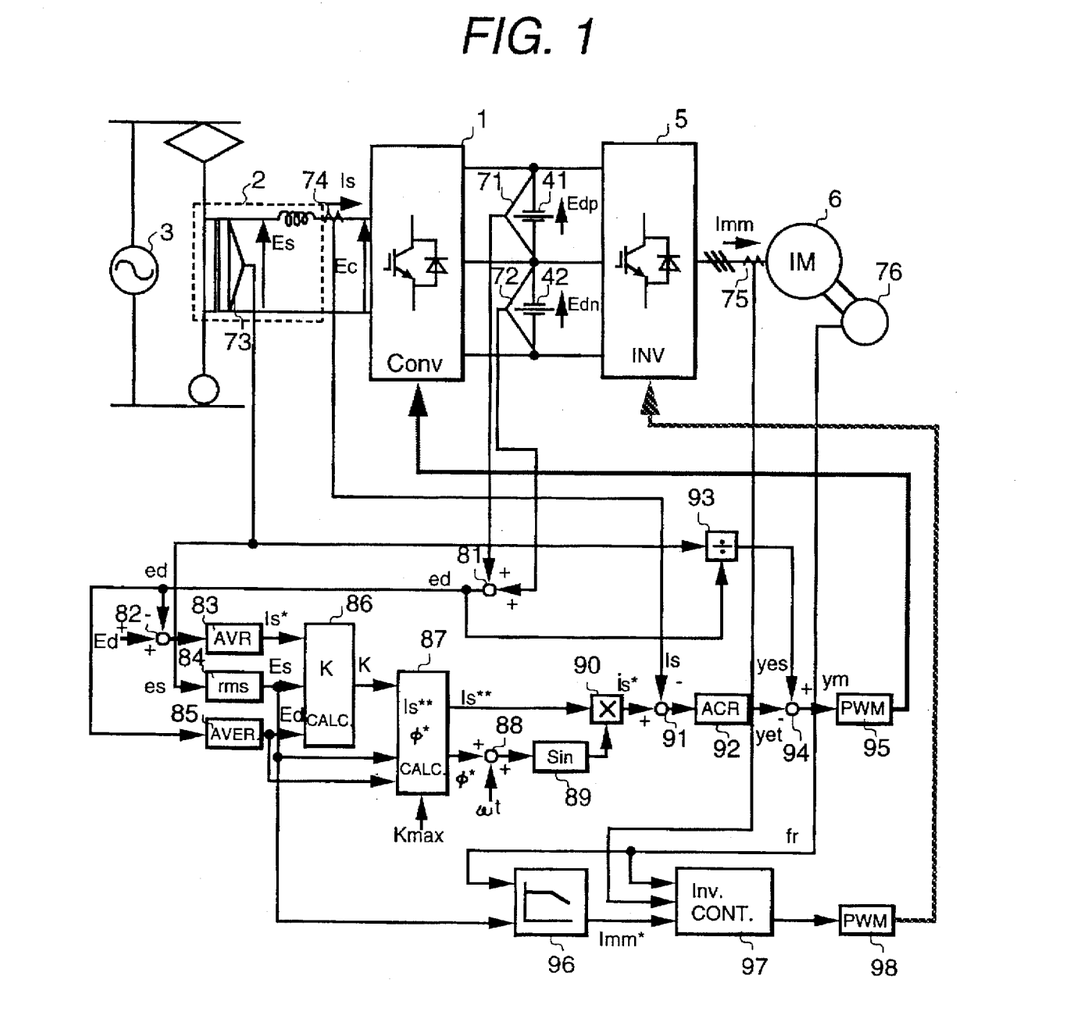
FIG. 1 is a schematic block diagram indicating one embodiment of the invention.
Figure 2A:
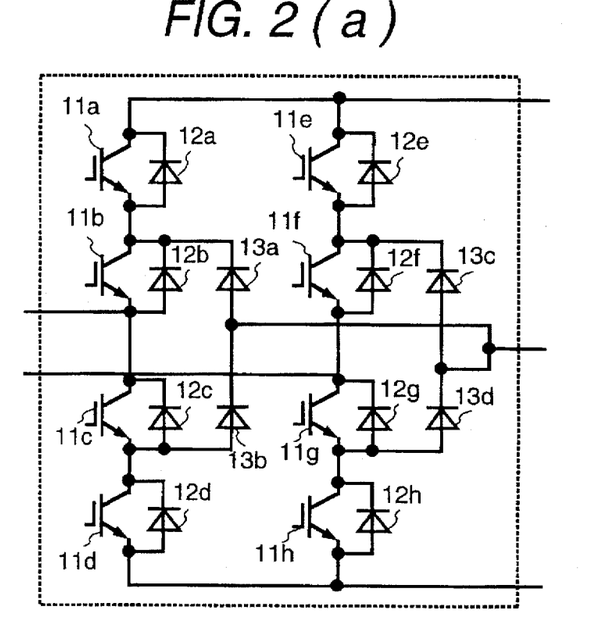
FIGS. 2(a) and (b) are schematic block diagrams indicating main circuit configurations of a power converter of the embodiment of FIG. 1.
Figure 2B:
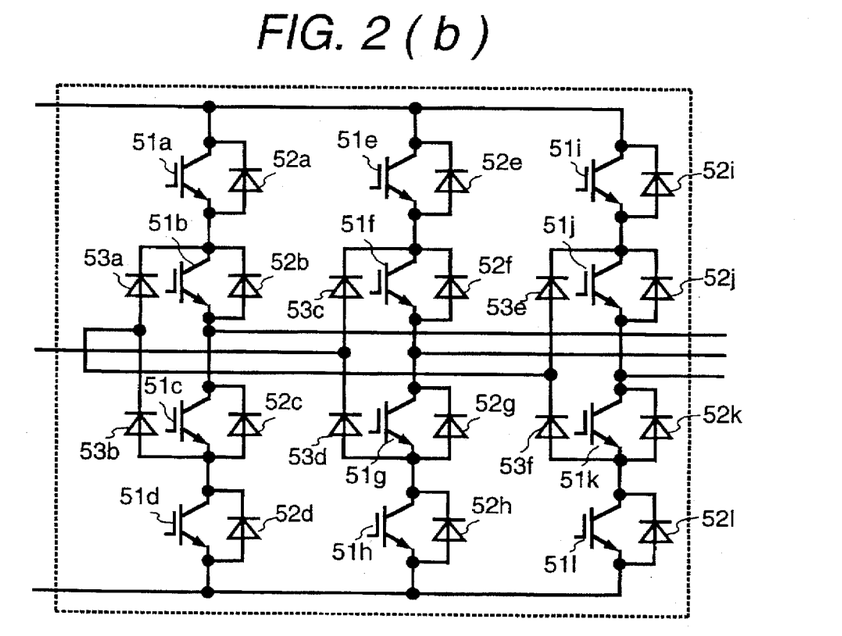

Electrical power converter 1 (hereinafter referred to as a converter) which converts A.C. to D.C. is a well-known three level converter, and is comprised of switching elements 11a to 11h and rectifier diodes 12a to 12h, 13a to 13d, as shown in FIG. 2(a). To the A.C. side of the converter 1 is connected to A.C. power supply 3 via transformer 2. Further, to the D.C. side of the converter there is connected a D.C. load, i.e., inverter 5, via capacitors 41, 42. To the A.C. side of the inverter there is connected an induction motor 6 for driving the electric trains. By way of example, inverter 5 is a known three-level inverter comprised of switching elements 51a to 51l, and rectifier diodes 52a to 52l, 53a to 53f, as depicted in FIG. 2(b).

A control unit for controlling the ON/OFF operation of switching elements 11a to 11h in converter 1 has the following structure and function. Voltage detectors 71 and 72 detect positive D.C. voltage Edp and negative D.C. voltage Edn, respectively, and these detected voltages are added by adder 81 to calculate a D.C. voltage ed. Subtracter 82 calculates the difference between D.C. voltage command value Ed* and the D.C. voltage ed. Voltage controller 83 calculates an A.C. current effective value command Is*. From A.C. voltage es, which is detected by voltage detector 73, an effective value calculator 84 calculates an A.C. voltage effective value Es. Likewise, from the D.C. voltage ed, an average value calculator 85 calculates a D.C. voltage average value Ed. From the A.C. current effective value command Is*, the A.C. voltage effective value Es and the D.C. voltage average value Ed, a modulation factor calculator 86 calculates a modulation factor K. From the modulation factor K, a maximum modulation factor thereof Kmax, the A.C. voltage effective value Es and the D.C. voltage average value Ed, the current and/or phase command value calculator 87 calculates an A.C. current effective value command compensation value Is** and phase command value φ*. An A.C. current command value is* is calculated by adding the present phase ωt and phase command value φ* in adder 88, generating a reference sine wave in sine wave generator 89, and multiplying the reference sine wave by A.C. current effective command compensation value Is** in multiplier 90.

In subtracter 91, there is obtained a difference between the A.C. current command value is* and the A.C. current is, which is detected by current detector 74. In accordance with this difference, current controller 92 obtains a control signal yet which corresponds to a voltage drop due to the impedance of the transformer. Further, divider 93 divides the A.C. voltage es by the D.C. voltage Ed to obtain a control signal yes corresponding to the A.C. power supply voltage. Subtracter 94 subtracts the control signal yet from the control signal yes to obtain a modulation wave signal ym. On the basis of this signal ym, the PWM controller 95 produces a pulse signal for controlling switching elements 11a to 11h in converter 1 to perform on and off operations thereof. In response to a speed signal fr, which is detected by speed detector 76, and the A.C. voltage effective value Es, the motor current pattern generator 96 produces a motor current command value Imm*, which is supplied to inverter controller 97. In response to motor current command value Imm*, the motor current Imm detected by current detector 75 and the speed signal fr, inverter controller 97 produces a modulation wave to the PWM controller 98, which in turn generates a pulse signal to control the switching elements 51a to 51l in inverter 5 to perform on and off operations.

Now, with reference to FIGS. 3 to 6(b), the operation of the embodiment of FIG. 1 will be described in detail in the following.

Figure 3:
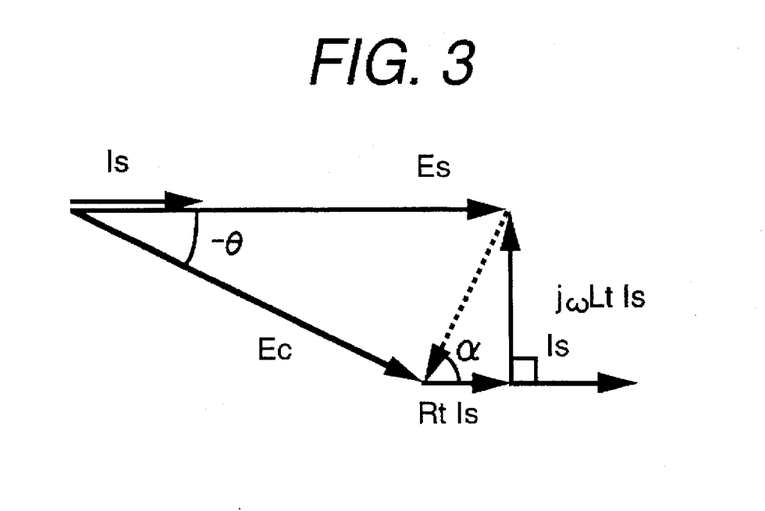
FIG. 3 is a vector diagram illustrating normal operation of the power converter.

FIG. 3 is a vector diagram representing the operation of the power converter with the power factor set at 1. Once the A.C. current effective value command Is* is determined, the effective value Ec of the converter voltage ec and the phase θ can be calculated by equations 1 and 2, respectively, as follows:

$$Ec = \sqrt{(Es - Rt \cdot Is^*)^2 - (2\pi fss \cdot Lt Is^*)^2} \quad \text{(eq. 1)}$$

$$\theta = -\tan^{-1} \frac{2\pi fss \cdot Lt \cdot Is^*}{Es - Rt \cdot Is^*} \quad \text{(eq 2)}$$

where fss is the frequency of the power supply, Rt is the resistance of the transformer, and Lt is the inductance of the transformer. Further, the modulation factor K is calculated by equation 3.

$$K = \frac{\sqrt{2} \cdot Ec}{Ed} \quad \text{(eq. 3)}$$

Figure 5:
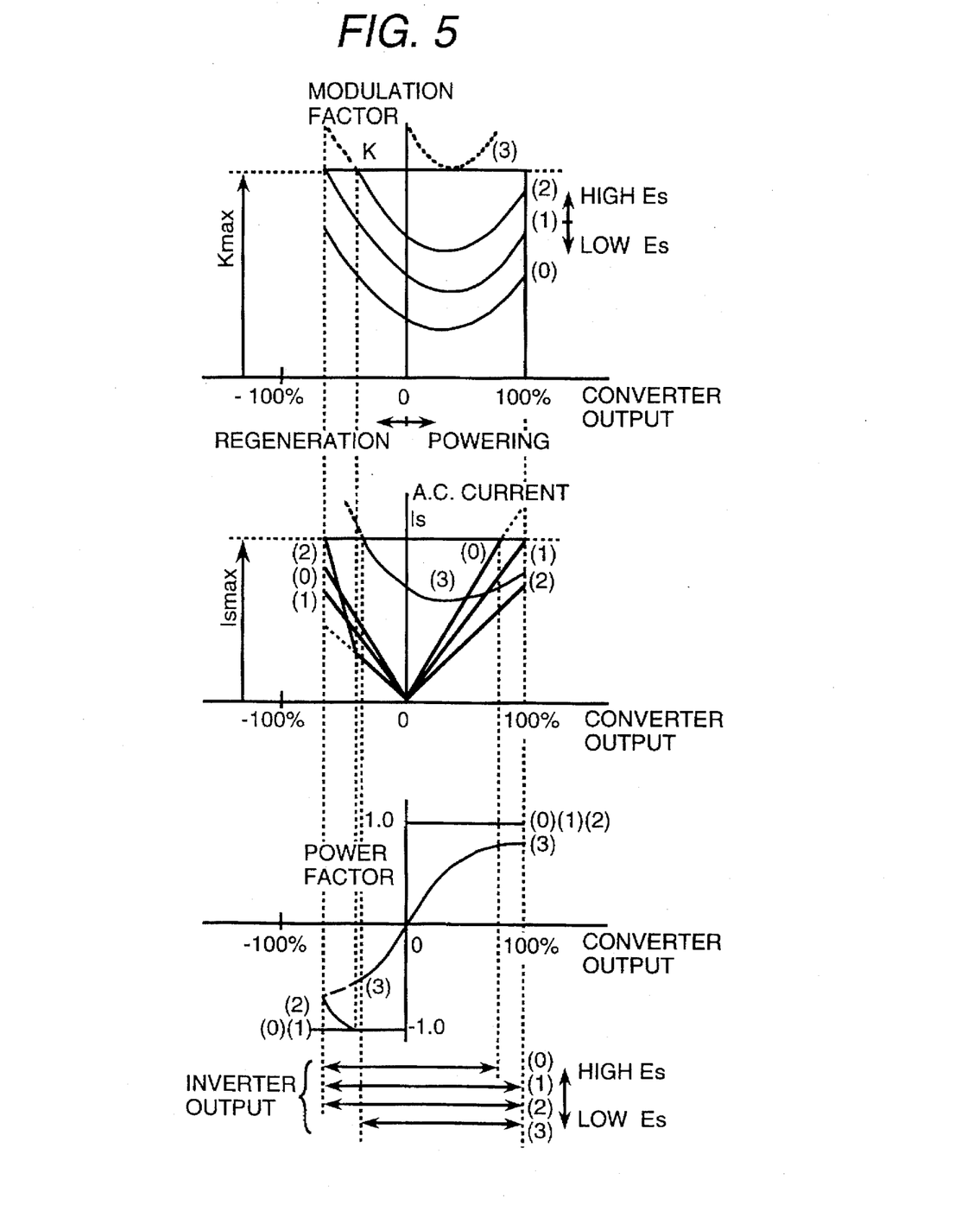
FIG. 5 is a characteristic diagram illustrating dynamic characteristics of operation of the power converter of the embodiment of FIG. 1.

FIG. 5 illustrates the characteristic of the modulation factor K, A.C. current Is and power factor, respectively, with respect to a converter output, the maximum output of which during powering and regeneration is assumed to be 100%, and when the A.C. voltage effective value Es on the side of the power supply is changed from (0) to (3) as a parameter. Although it depends on a constant of the main circuit of the system, since less power is generally required during regeneration than during powering, the A.C. current Is often becomes greater on the side of powering. In contrast, with respect to the modulation factor, since its minimum point shifts toward the powering side due to the resistance Rt of the transformer, the modulator fact tends to become greater on the regeneration side.

So long as the modulation factor K does not exceed its upper limit value Kmax, it is possible to operate the converter at the power factor of 1 through the control sequences described above in accordance with the aforementioned A.C. current effective value command Is* and with the phase command value φ* set at 0.

Figure 4:
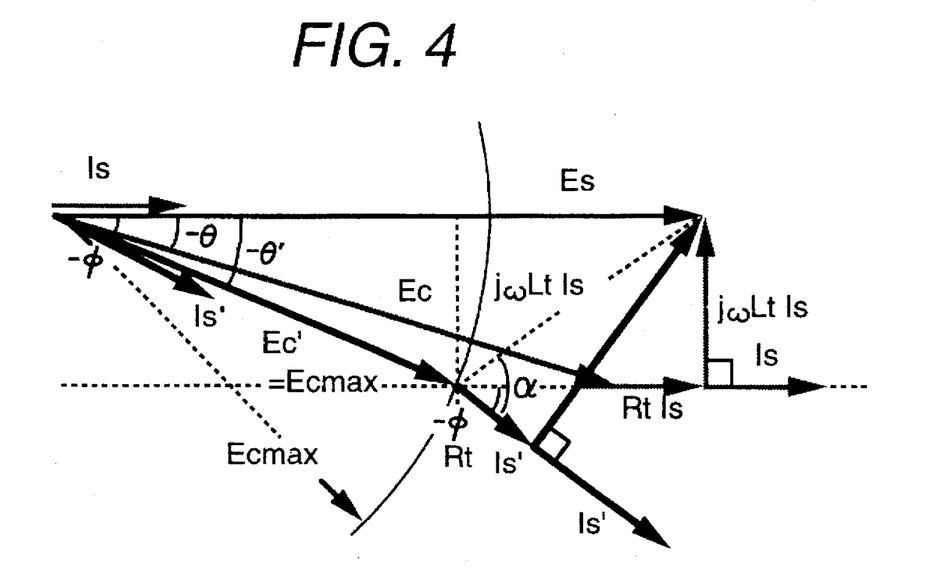
FIG. 4 a vector diagram illustrating operation during power factor reduction.

Now, let's consider the system operation when the power supply voltage increases. FIG. 4 shows a vector diagram for such an occasion. In order to carry out an operation at a power factor of 1 with an increased power supply voltage Es, it is necessary for the converter voltage Ec to be increased as well. However, the converter cannot output a voltage greater than its maximum value Ecmax, which is determined by the maximum modulation factor Kmax. Any attempt to continue operation under such circumstances will cause a problem, such as the occurrence of harmonics due to an overcurrent or distortion in the A.C. current.

Here, the maximum voltage of the converter can be expressed by equation 4.

$$E_{cmax} = \frac{K_{max} \cdot Ed}{\sqrt{2}} \quad \text{(eq. 4)}$$

Further, since an instantaneous value of converter voltage ec cannot exceed the D.C. voltage ed, it is not possible for that maximum modulation factor Kmax to exceed 1 under any ideal condition. In view of a minimum pulse width available and a control margin to be ensured, it is necessary to set the modulation factor at a value less than 1 in practice.

With reference to FIG. 4, under such circumstances as described above, the converter voltage Ec' is set at a cross point between a circle drawn from an origin with a radius of Ecmax and a dotted line drawn parallel to the A.C. voltage Es from the terminal of the original converter voltage Ec. Through such processing, the A.C. current Is' becomes greater than the original A.C. current Is, and although the power factor drops, since the phase angle becomes −φ, the converter voltage Ec' will not exceed its maximum value Ecmax, thereby so that the converter output can maintain its original value.

In order to carry out the power factor control as indicated in FIG. 4, the current and phase command value calculator 87 in FIG. 1 computes the A.C. current effective command compensation value Is** and the phase command value φ* according to the following equations 5 and 6:

$$\phi^* = 0 \quad (K \geq K_{max}), \quad \text{(eq. 5)}$$

$$\phi^* = \tan^{-1}\left(\frac{2\pi fssLt \cdot Is^*}{Es - \sqrt{E_{cmax}^2 - (\omega Lt Is^*)^2}}\right) - \alpha \quad (K \leq K_{max})$$

$$Is^{**} = Is^* \quad (K \leq K_{max}), \quad \text{(eq. 6)}$$

$$Is^{**} = \frac{2\pi fssLt \cdot Is^*}{Zt \cdot \sin(\alpha + \phi^*)} \quad (K \geq K_{max})$$

where, Zt is an impedance of the transformer and α is a phase angle, which can be expressed by the following equations 7 and 8, respectively.

$$Zt = \sqrt{Rt^2 + (2\pi f_{ss}Lt)^2} \qquad \text{(eq. 7)}$$

$$\alpha = \tan^{-1}\frac{2\pi f_{ss}Lt}{Rt} \qquad \text{(eq. 8)}$$

Thereby, it becomes possible to suppress the occurrence of harmonics due to overcurrents and distortion in the power supply and continue the operation. Parameter curves (2) and (3) in FIG. 5 depict dynamic characteristics under such circumstances.

With respect to parameter (2) in FIG. 5, since its modulation factor is low in a region where powering and regeneration power are small, normally a power factor control at 1 is adopted, and where its A.C. current Is becomes lower than that for parameter (1) since its A.C. voltage is higher than that for parameter (1). Further, in a region where its regeneration power becomes large, its A.C. current Is increases and its power factor decreases, since power factor control to suppress the modulation factor at Kmax is carried out.

With respect to parameter (3) in FIG. 5, since its inherent modulation factor is higher than Kmax throughout its whole operating region, as indicated by dotted curve (3), power factor control is applied over its whole operating region. Thereby, its A.C. current Is is relatively large even in a region where the output is small, and its power factor is low throughout its whole operating region.

By way of example, in the case of parameter (3) in FIG. 5, when the regeneration power further increases, there occurs a region where the A.C. current Is may exceed the maximum value Ismax which is determined by the capacity of the switching elements and cooling capacity of the converter 1. Should the operation be continued in such region, there would be a risk of a system failure or breakdown, and so there arises a necessity to limit the A.C. current to Ismax or below.

If a limiter is provided in a rear stage of the current and phase command value calculator 87 so that A.C. current effective command compensation value Is** does not exceed Ismax, however, unless the power of the inverter 5 is changed and adjusted, there occurs an unbalance in the powers between converter 1 and inverter 5. In such case, the voltages of capacitors 41, 42 will decrease during powering, thereby failing to operate as a PWM power converter. In addition, since the voltage across the capacitors will increase during regeneration, the operation of the whole system must be stopped to protect the system.

In order to prevent the occurrence of such a problem, the motor current pattern generator 96 is enabled to reduce the motor current command value Imm* on the basis of the A.C. voltage Es and the speed signal fr so as to enable power suppression of the inverter 5. Thereby, in the case of parameter (3) in FIG. 5, operation in the region where the A.C. current Is exceeds the upper limit value Ismax is avoided and the operation is maintained at or below the upper limit value, thereby suppressing overcurrents and continuing the operation.

Next, the operation in a region where the A.C. voltage Es is low will be considered. As indicated by parameter (0) in FIG. 5, since the modulation factor K is low when the A.C. voltage becomes low, no power factor control is needed. However, due to a low A.C. voltage Es, the A.C. current Is increases relative to the same output. Thereby, in a region where the output becomes large, the A.C. current Is exceeds the upper limit value Ismax. Likewise, in such a case, the motor current pattern generator 96 operates to reduce the motor current command value Imm* so as to limit the power of the inverter 5, thereby to ensure continued operation.

Figure 6A:
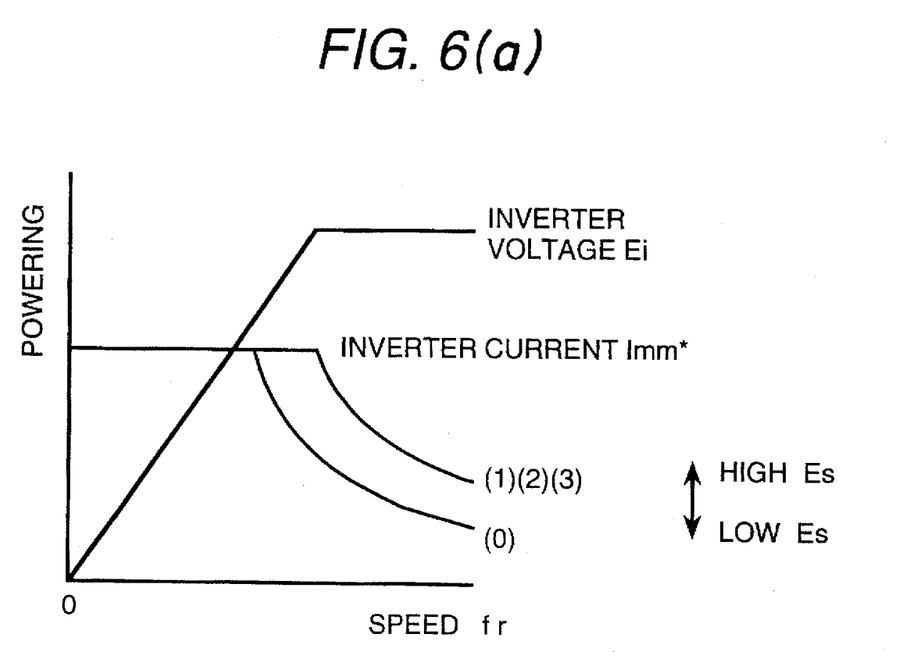
FIGS. 6(a) and 6(b) are schematic diagrams indicating current limit values for the inverter of the embodiment of FIG. 1.
Figure 6B:
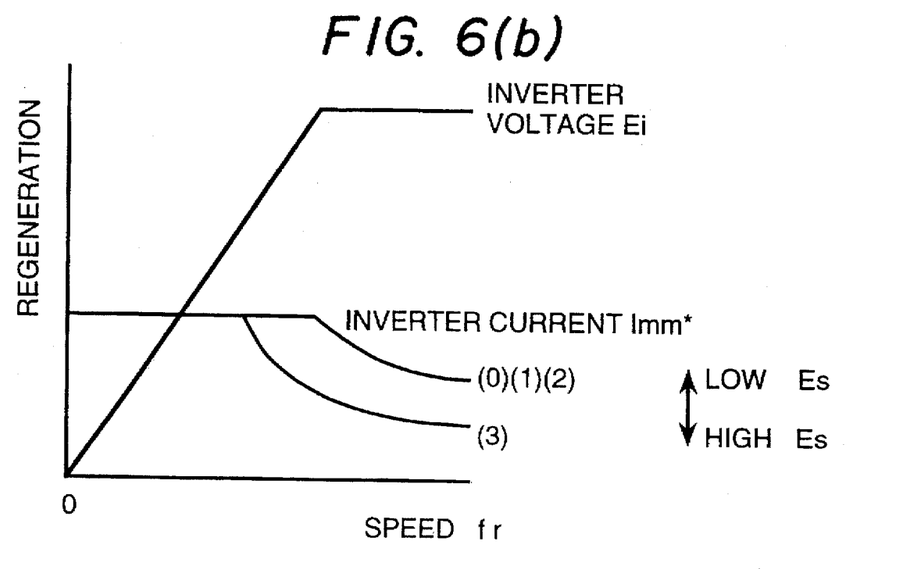

FIGS. 6(a) and 6(b) examples of the motor current command value Imm* to be generated from the motor current generator 96 depicted in FIG. 1. According to the characteristic diagrams depicted in FIG. 5, at the time of powering, the motor current command value Imm* is reduced in a region where the A.C. voltage Es is low, while at the time of regeneration, the motor current command value Imm* is reduced in a region where A.C. voltage is high. In either case, it is only in a high speed region that the power limit control is executed by reducing the motor current, and so it is not necessary to execute the power limit control over the whole range of speed.

In FIG. 6(b), the power limit control is shown as being executed in a high A.C. voltage region during regeneration, while FIG. 6(a) shows that it is executed in a lower A.C. voltage region during powering, but the invention is not limited thereto. For example, there may be such a case where both the powering and regeneration powers must be limited in the above-mentioned regions depending on the constant of the main circuit of the system, or a case where no power limit is required at all in either of the above-mentioned circumstances. In any case, the problem can be dealt with readily by substituting an appropriate motor current pattern in FIG. 6(a) and/or FIG. 6(b).

In the implementation of the aforementioned design concept according to the invention, the power factor control is applied to converter 1 only in a partial operating region designated so as to allow its power factor to decrease in that partial operating region, and the power limit control is applied to inverter 5 only in another partial operating region designated so as to allow its power to decrease in that other partial operating region, so that, by a combination of such control operations, a PWM power conversion system having a relatively small capacity can produce a relatively large output.

Figure 7:
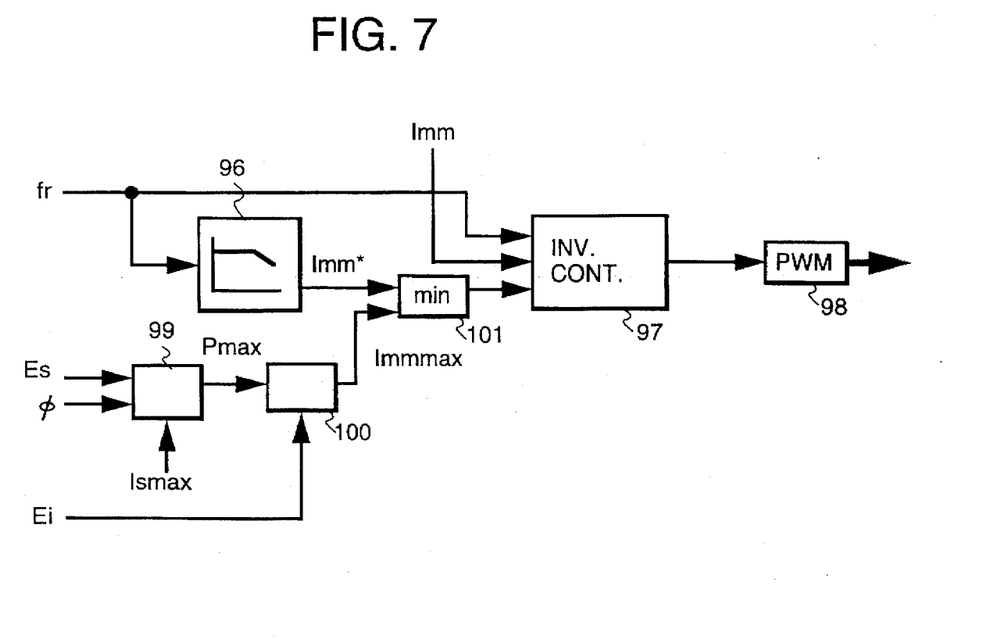
FIG. 7 is a schematic block diagram of another embodiment of the invention.

Another embodiment of the invention will be described below with reference to FIG. 7. Only main parts of this embodiment of the invention, which relates to power control of an inverter, is depicted for simplification of description. In response to the A.C. voltage effective value Es, the power factor angle φ and the A.C. current upper limit value Ismax, the maximum power calculator 99 computes a maximum power Pmax which its converter can output under a present condition available with a present A.C. voltage and power factor. According to this computed value of Pmax and the inverter voltage Ei, the maximum motor current calculator 100 computes a value of the maximum motor current Immmax, where the maximum power Pmax and the maximum motor current Immmax can be expressed by equations 9 and 10, respectively, as follows:

$$P_{max} = E_s \cdot I_{smax} \cdot \cos\phi \qquad \text{(eq. 9)}$$

$$I_{mmmax} = \frac{P_{max}}{3 \cdot E_i \cdot pfm} \qquad \text{(eq. 10)}$$

where pfm is a power factor of the motor.

Further, the minimum value generator 101 selectively outputs the smaller one of the motor current command value Imm*, which is output from motor current pattern generator 96 on the basis of speed signal fr, and the maximum motor current Immmax. In the subsequent steps, inverter 5 is controlled using the inverter controller 97, and the like, in the same manner as in the embodiment of FIG. 1.

Thereby, the power limit control of the inverter can be implemented with the provision of only one type of pattern without providing various motor current patterns corresponding to various A.C. voltages, thereby simplifying the control circuit thereof. Further, it becomes easy to deal with such occasions where its circuit constant varies.

Hereinabove, the aforementioned embodiments of the to a invention have been described by way of example with reference to a three-level converter and a three-level inverter system, however, the invention is not limited thereto, and any modification as applied to a two-level or multi-level conversion system should be construed to fall within the scope of the present invention.

As described hereinabove, the following advantages have been accomplished according to the invention. The PWM power conversion system of the invention is controlled to allow its power factor to decrease in a designated region and to limit the power of its D.C. load in another designated region, such that an overcurrent is prevented even if the power supply voltage fluctuates, thereby ensuring that the operation will continue. Therefore, the capacity of the converter can be reduced over the prior art converter for the same power output requirement.

What is claimed is:

1. A power conversion apparatus comprising: a PWM power converter for converting A.C. to D.C., said PWM power converter having an inductance element connected to an A.C. power supply side thereof and a capacitor or battery connected to a D.C. load side thereof; a voltage control device provided for said power converter for adjusting its D.C. output voltage; a power factor control device provided for said power converter for adjusting a power factor on the A.C. side thereof; a command device for producing command signals, including a PWM modulation factor signal and a phase signal, in response to said voltage and an output from said power factor control device; and a PWM modulation device for controlling said power converter in response to said command signals; wherein said power factor control device includes enable means for allowing said power factor to be reduced when a control parameter related to a modulation factor of said power converter approaches its limit value; and limit means for limiting the power of the D.C. load when a control parameter related to an input power of said power converter approaches its limit value.

2. The power conversion apparatus according to claim 1, wherein said limit value related to the input power of said power converter is an upper limit value of the input current of said power converter.

3. The power conversion apparatus according to claim 1, wherein said limit means for limiting the power of the D.C. load is a current limiting device for limiting a current to said D.C. load.

4. The power conversion apparatus according to claim 1, wherein said limit means for limiting the current of said D.C. current load is a means for reducing a powering current when said A.C. power supply voltage becomes low, and for reducing a regeneration current, when said A.C. power supply voltage becomes high.

5. The power conversion apparatus according to claim 1, wherein said limit means for limiting the current of said D.C. load calculates an upper limit value of a D.C. load current sequentially from said A.C. power supply voltage and said A.C. power supply current, said upper limit value being used as a limit value for said D.C. load.

* * * * *